United States Patent [19]
Hilbish et al.

[11] Patent Number: 5,984,591
[45] Date of Patent: Nov. 16, 1999

[54] THRUST SLOT AIR CONVEYOR HAVING A VARYING SLOT ANGLE

[75] Inventors: Brian K. Hilbish, Bedford; Michael A. Wilson, Big Island, both of Va.

[73] Assignee: Simplimatic Engineering Company, Lynchburg, Va.

[21] Appl. No.: 09/129,970

[22] Filed: Aug. 6, 1998

Related U.S. Application Data

[63] Continuation-in-part of application No. 08/828,760, Apr. 1, 1997, Pat. No. 5,820,306, which is a continuation-in-part of application No. 08/616,244, Mar. 15, 1996, Pat. No. 5,695, 302.

[51] Int. Cl.⁶ .................................................. B65G 51/02
[52] U.S. Cl. .................................................................. 406/88
[58] Field of Search .......................................... 406/86, 88

[56] References Cited

U.S. PATENT DOCUMENTS

| | | | |
|---|---|---|---|
| 3,318,640 | 5/1967 | Coville | 406/88 |
| 3,718,371 | 2/1973 | Lasch, Jr. | 406/88 |
| 3,773,391 | 11/1973 | Crandall et al. | 406/88 |
| 3,904,255 | 9/1975 | Neumann et al. | 384/12 |
| 4,283,370 | 8/1981 | Putral et al. | 423/6 |
| 4,822,214 | 4/1989 | Aidlin et al. | 406/86 |
| 5,028,174 | 7/1991 | Karass | 406/88 |
| 5,161,919 | 11/1992 | Smith et al. | 406/86 |
| 5,299,889 | 4/1994 | Langenbeck | 406/88 |
| 5,437,521 | 8/1995 | Ouellette | 406/88 |
| 5,553,698 | 9/1996 | Patois et al. | 198/626.1 |
| 5,611,647 | 3/1997 | Ouellette | 406/88 |

FOREIGN PATENT DOCUMENTS

| | | | |
|---|---|---|---|
| 90/03933 | 4/1990 | WIPO | 406/88 |
| 90/10587 | 9/1990 | WIPO | 406/88 |

*Primary Examiner*—Andrew C. Pike
*Attorney, Agent, or Firm*—St. Onge Steward Johnston & Reens LLC

[57] ABSTRACT

An air conveyor includes guides for stabilizing articles during conveyance and a plenum with apertures for providing pressurized air. In the preferred embodiment, the air conveyor also includes opposed spacers defining passages having a closed end and an open end. The passages are in fluid communication with the apertures of the plenum for directing streams of pressurized air through the open ends at the articles in a downstream direction to propel the articles. In another embodiment, channels defined in support structure for the guides form part of passageways for directing streams of pressurized air at an inclined and downstream angle to propel the articles. The guides are removable to allow the conveyor to be adapted to different sized and shaped articles. The air conveyor may also include an additional plenum and additional opposed spacers associated with the plenum for propelling the articles downstream. The angle of the slots can be larger for creating an article-to-article separation or smaller for creating a contiguous article flow.

16 Claims, 13 Drawing Sheets

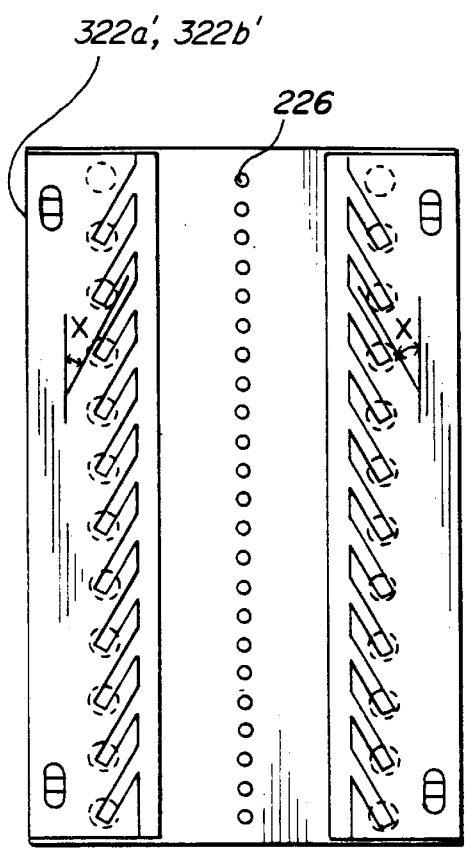
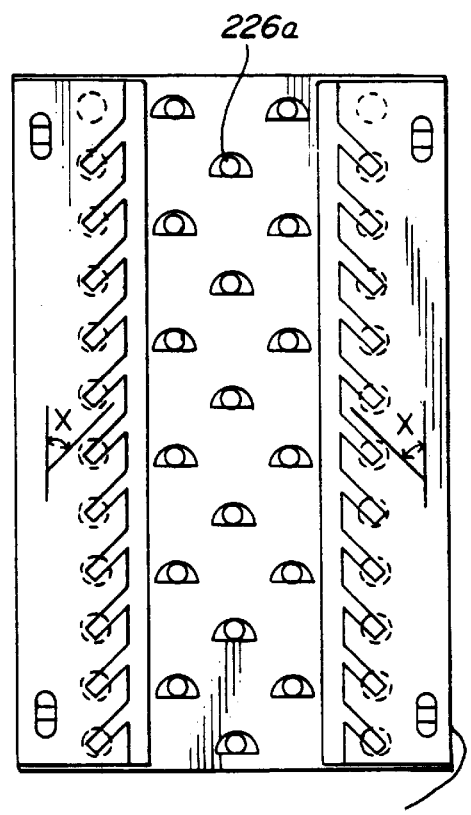
FIG. 6
FIG. 7

THRUST SLOT AIR CONVEYOR HAVING A VARYING SLOT ANGLE

CROSS REFERENCE TO RELATED APPLICATION

This application is a continuation-in-part of U.S. Ser. No. 08/828,760, filed Apr. 1,1997, entitled "Thrust Slot Air Conveyor," U.S. Pat. No. 5,820,306, which is a continuation-in-part of U.S. Ser. No. 08/616,244, filed Mar. 15,1996, entitled "Thrust Slot Neck-Guided Air Conveyor," U.S. Pat. No. 5,695,302.

FIELD OF THE INVENTION

The invention relates to air conveyors, and more specifically, to air conveyors for transporting articles with or without collars.

BACKGROUND OF THE INVENTION

In air conveyor systems for articles, the articles are commonly transported along the conveying line by jets of pressurized air. For articles with collars, such as bottles, the collars or the neck areas are used for transport. Various pressurized air systems for transporting articles have been attempted in previous designs.

For example, U.S. Pat. No. 5,161,919 to Smith discloses several bottle conveyors which support bottles by the collar and which include apertures for directing pressurized air at a shoulder region of the bottles. Smith also discloses sloping neck guides to reduce friction with the collars/rings.

U.S. Pat. Nos. 4,284,370 to Danler et al. and 4,822,214 to Aidlin et al. disclose conveyor devices in which air is directed onto the necks of bottles from above the neck guides.

Another example is U.S. Pat. No. 5,299,889 to Langenbeck which discloses a neck guide air conveyor which includes apertures below the neck guides which direct air at an upward angle of approximately 45 degrees toward the underside of the collars. This design provides some lift to the bottles in an apparent attempt to reduce the friction between the collars and the neck guides.

The prior art conveyors do not disclose designs that are readily adaptable to effectively and efficiently transport articles with collars as well as articles without collars. Furthermore, these prior art conveyor designs are not readily adjustable for maximizing transport efficiency of various size and shape articles. These deficiencies are increasingly critical because it is becoming increasingly important that conveying lines and whole plants be easily and quickly adaptable to efficiently handle articles of various type, size, and shape.

What is desired therefore is an air conveyor design which can effectively and efficiently transport articles with collars as well as articles without collars. It is also desired to provide an air conveyor which is readily adaptable to different types and sizes of articles for meeting the rapid changeover requirements of conveying lines and plants while transporting articles at maximum efficiency. It is further desired to provide an air conveyor which is readily adaptable to allow for either a separation between the articles during conveyance or a contiguous article flow.

SUMMARY OF THE INVENTION

Accordingly, it is an object of the invention to provide a conveyor design which employs pressurized air to efficiently and effectively transport articles with or without collars.

A further object is to provide an air conveyor design which is readily adaptable to different types and sizes of articles.

It is yet another object of the invention to provide an air conveyor design which is adaptable to create either a separation between the articles during conveyance to prevent damage to the articles or a contiguous flow of articles at a high velocity.

These and other objects are realized by the present air conveyor which includes guides for stabilizing articles during conveyance and a plenum with apertures for providing pressurized air. In the preferred embodiment, the air conveyor also includes opposed spacers defining passages having a closed end and an open end. The passages are in fluid communication with the apertures of the plenum for directing streams of pressurized air through the open ends at the articles in a downstream direction to propel the articles. In another embodiment, channels defined in support structure for the guides form part of passageways for directing streams of pressurized air at an inclined and downstream angle to propel the articles. The guides are removable to allow the conveyor to be adapted to different sized and shaped articles. The air conveyor may also include an additional plenum and additional opposed spacers associated with the plenum for propelling the articles downstream. The angle of the slots can be larger for creating an article-to-article separation or smaller for creating a contiguous article flow.

The invention and its particular features and advantages will become more apparent from the following detailed description considered with reference to the accompanying drawings.

BRIEF DESCRIPTION OF THE DRAWINGS

FIGS. 6 and 7 are top views of plenum surfaces of FIG. 4 having different thrust hole configurations.

DETAILED DESCRIPTION OF THE INVENTION

Figure 1:
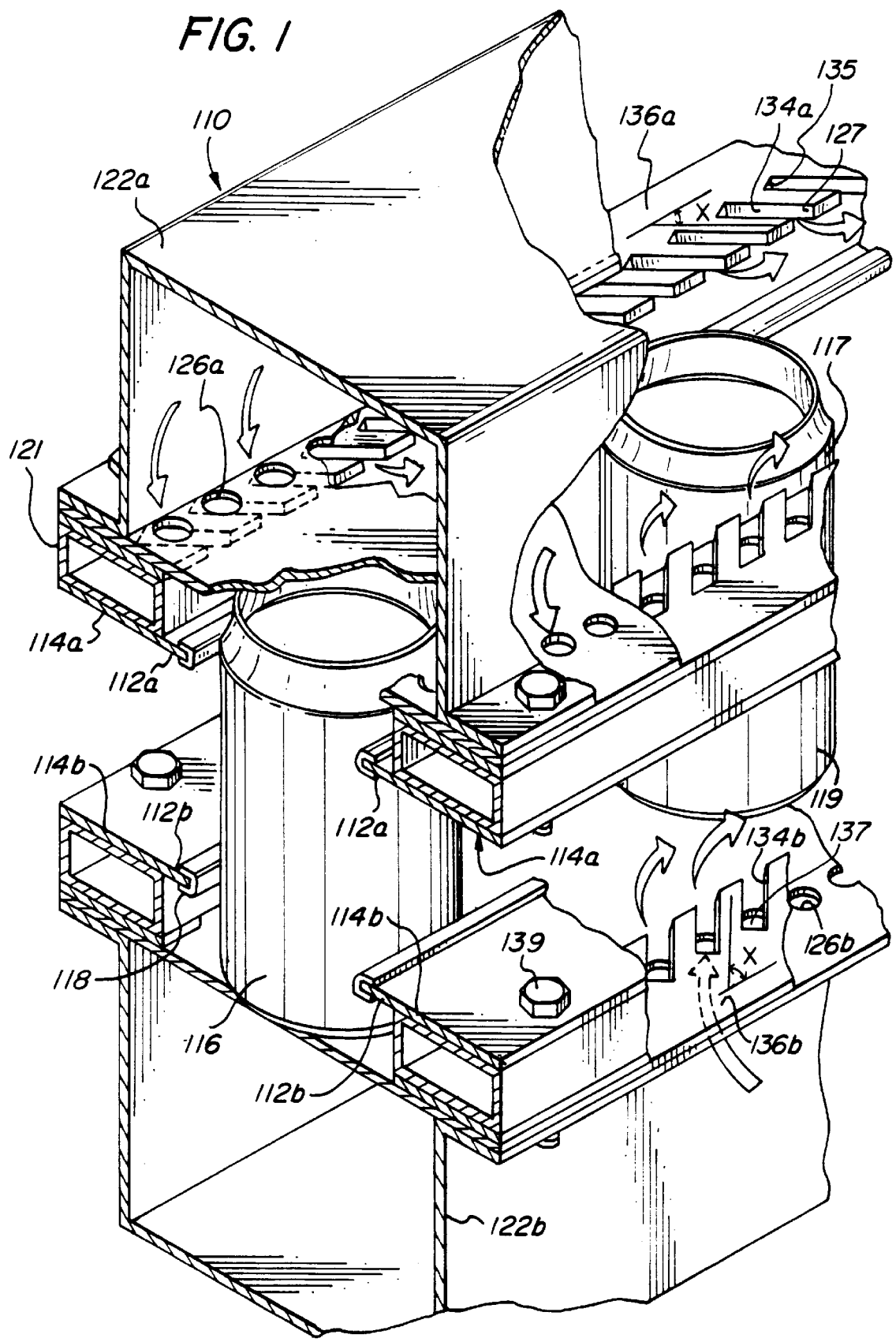
FIG. 1 is a cutaway, isometric view of an embodiment of an air conveyor for articles without collars in accordance with the invention showing the flow of pressurized air to convey the articles downstream.
Figure 2:
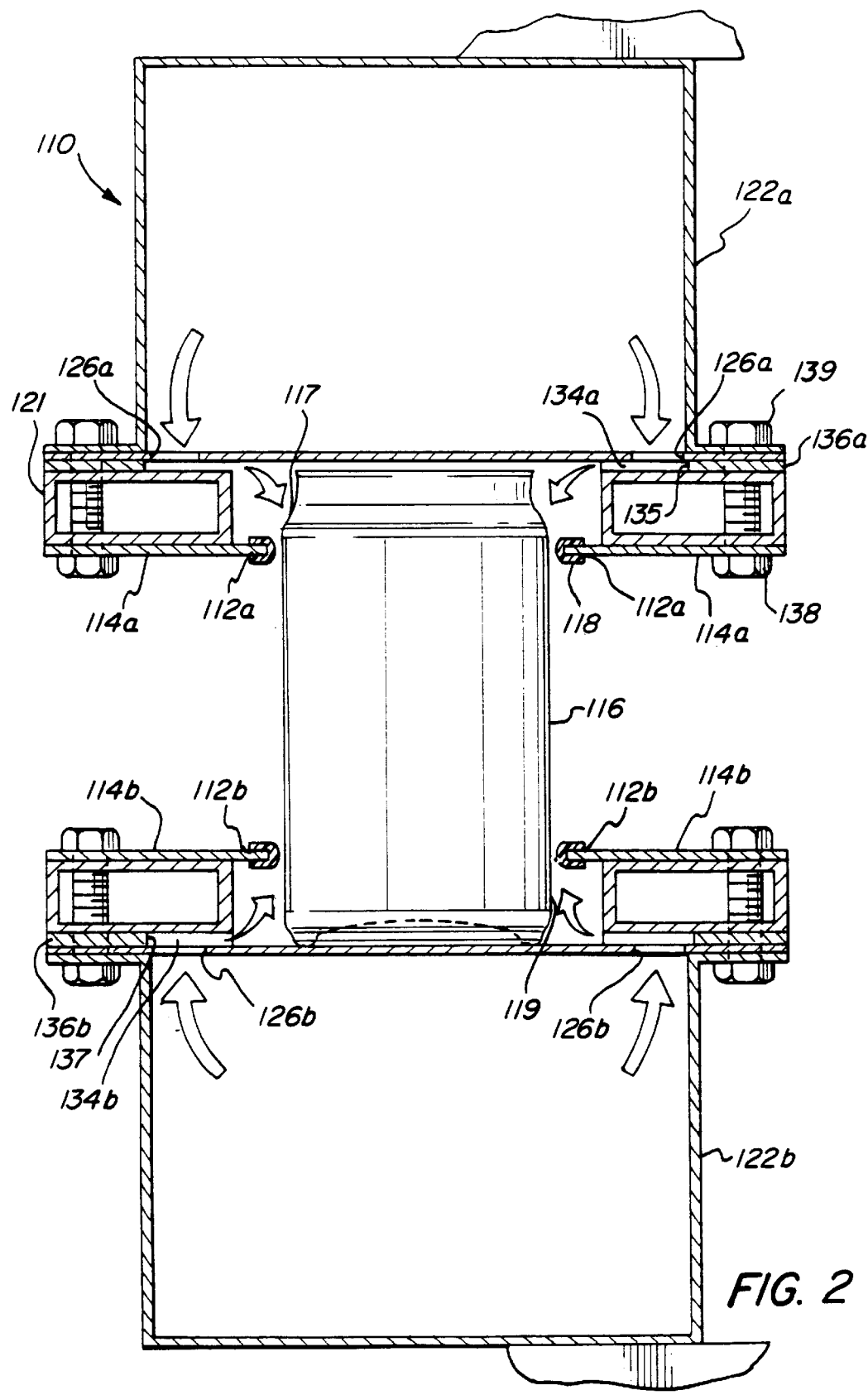
FIG. 2 is a cross-sectional end view of the air conveyor of FIG. 1.

FIGS. 1 and 2 show an air conveyor 110 for articles 116 without collars in accordance with the invention which includes a first set of guides 112a, a second set of guides 112b, and corresponding support structures 114a, 114b. As illustrated, the guides 112a, 112b may comprise wear strips 118 attached thereto. A first plenum 122a, which serves as a source of pressurized air, includes apertures 126a which are aligned with slots 134a in spacers 136a placed between support structures 114a and the first plenum 122a. Slots 134a have a closed end 135 adjacent the apertures 126a and an open end 127 open toward the articles 116 to provide passages for the streams of pressurized air.

A second plenum 122b, which also serves as a source of pressurized air, includes apertures 126b which are aligned with slots 134b in spacers 136b placed between support structures 114b and the second plenum 122b. Slots 134b have a closed end 137 adjacent the apertures 126b and an open end 129 open toward the articles 116 to provide passages for the streams of pressurized air. In FIGS. 1 and 2, there are shown two sets of opposed guides 112a, 112b, two sets of spacers 136a, 136b, and two plenums 122a, 122b; however, it should be apparent to those skilled in the art that the air conveyor in accordance with the invention may utilize only one set of opposed guides, one set of spacing members, and/or one plenum or multiples sets of opposed guides, multiple sets of spacing members, and/or multiple plenums.

In the embodiment shown, the pressurized air from the first plenum 122a is directed by the slots 134a to emerge from the open ends 127 substantially proximate the tops 117 of the articles 116 in a downstream direction to propel the articles 116. The pressurized air from the second plenum 122b is directed by the slots 134b to emerge from the open ends 129 substantially proximate the bottoms 119 of the articles 116 in a downstream direction to propel the articles 116. However, the position of the pressurized air emerging from the open ends 127, 129 relative to the height of the articles 116 is adjustable by selecting spacers 136a, 136b of different thickness.

FIGS. 1 and 2 illustrate spacing members 121 adjacent the spacers 136a, 136b for positioning the guides 112a, 112b where desired with respect to the articles 116. These spacing members 121 may or may not be necessary depending upon the articles being conveyed. As shown, the plenums 122a, 122b, the spacers 136a, 136b, the spacing members 121, and the support structures 114a, 114b are held together by screws 139 and nuts 138. Other known methods of providing removable attachments may also be used.

The air conveyor 110 of FIGS. 1 and 2 is designed to provide easy removability of the guides 112a, 112b to accommodate different types and sizes of articles.

Figure 3:
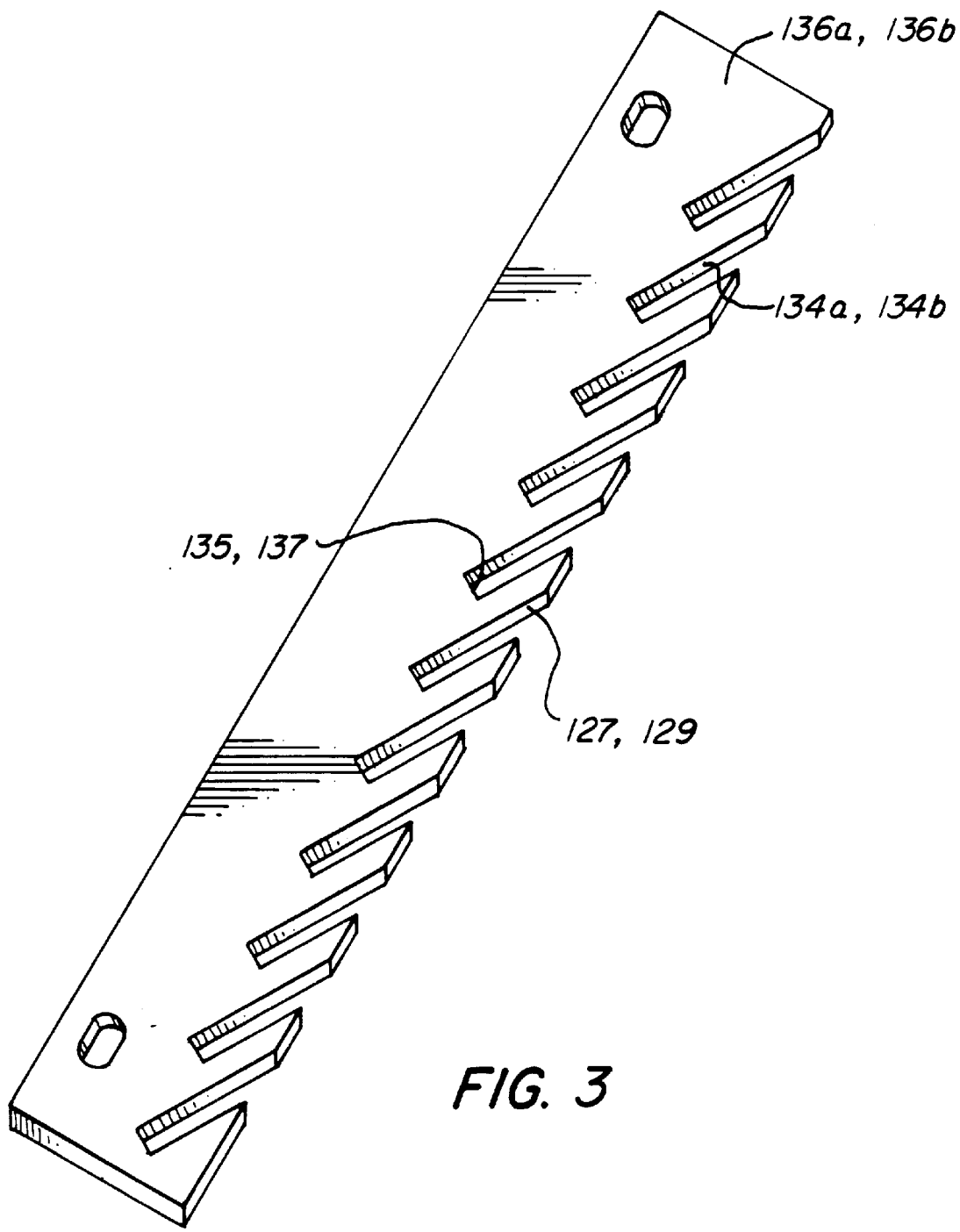
FIG. 3 is a top perspective of the spacer with slots forming passages for directing pressurized air of FIG. 1.

FIG. 3 shows a spacer 136a, 136b with slots 134a, 134b angled downstream to provide passages for the streams of pressurized air to be directed towards the articles 116 in a downstream direction.

Figure 4:
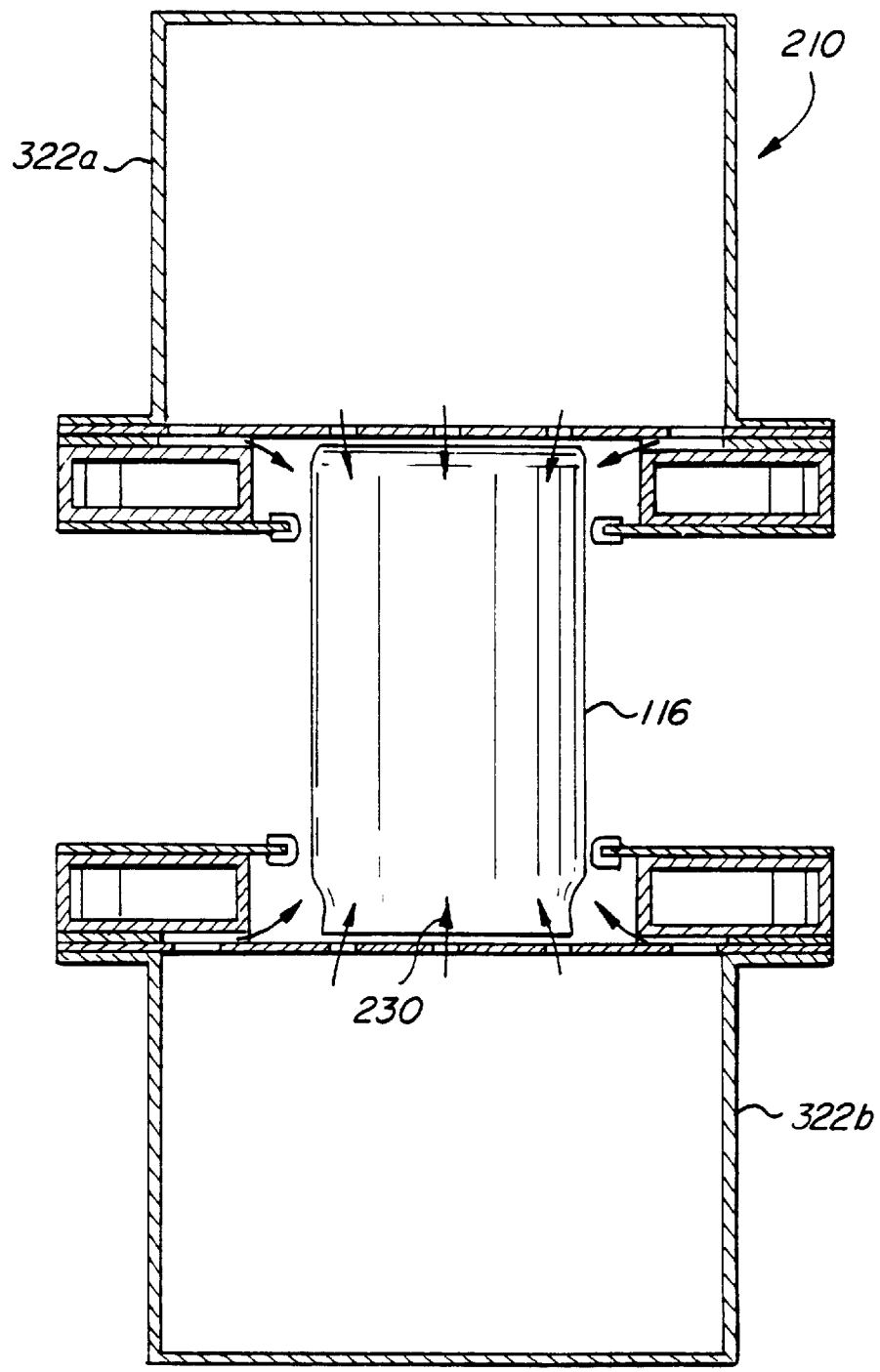
FIG. 4 is an end view of another embodiment of an air conveyor for articles without collars in accordance with the invention showing thrust holes in plenums.
Figure 5:
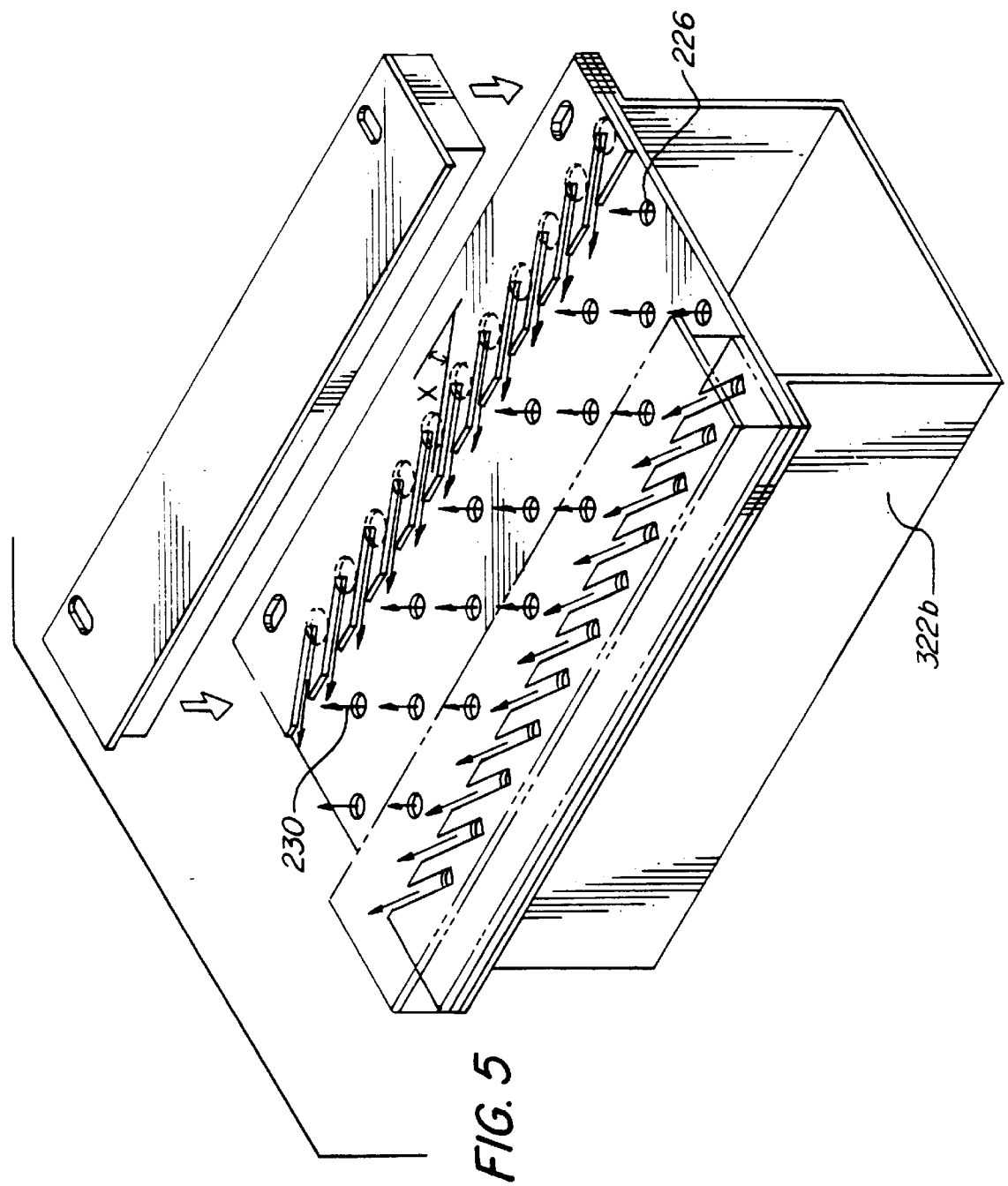
FIG. 5 is a perspective of the bottom-half portion of the air conveyor of FIG. 4.

Referring to FIGS. 4 and 5, there is shown another embodiment of an air conveyor 210 for articles 116 without collars in accordance with the invention. This embodiment is similar to the embodiment illustrated in FIG. 1, with the exception of thrust holes 226 provided in the plenums 322a, 322b. The thrust holes 226 preferably provide jets or streams of vertical pressurized air 230 shown in FIG. 4, to the articles 116, thereby lifting the articles I116 so that there is reduced friction as the articles 116 are directed downstream by the streams of pressurized air from the open ends 9 of the slots. Although both plenums 322a, 322b may have thrust holes, it should be apparent that friction reduction can also be achieved by providing thrust holes in only one plenum.

FIGS. 6 and 7 illustrate two examples of thrust hole configurations for the plenums 322a, 322b of FIG. 4. FIG. 6 shows the plenums 322a', 322b' having a single sequence of thrust holes 226 centrally positioned along the plenum 322a, 322b. And FIG. 7 illustrates the plenums 322a,"322b" having the thrust holes 226a as louvers. Other thrust hole configurations may also be used for reducing friction.

Figure 8:
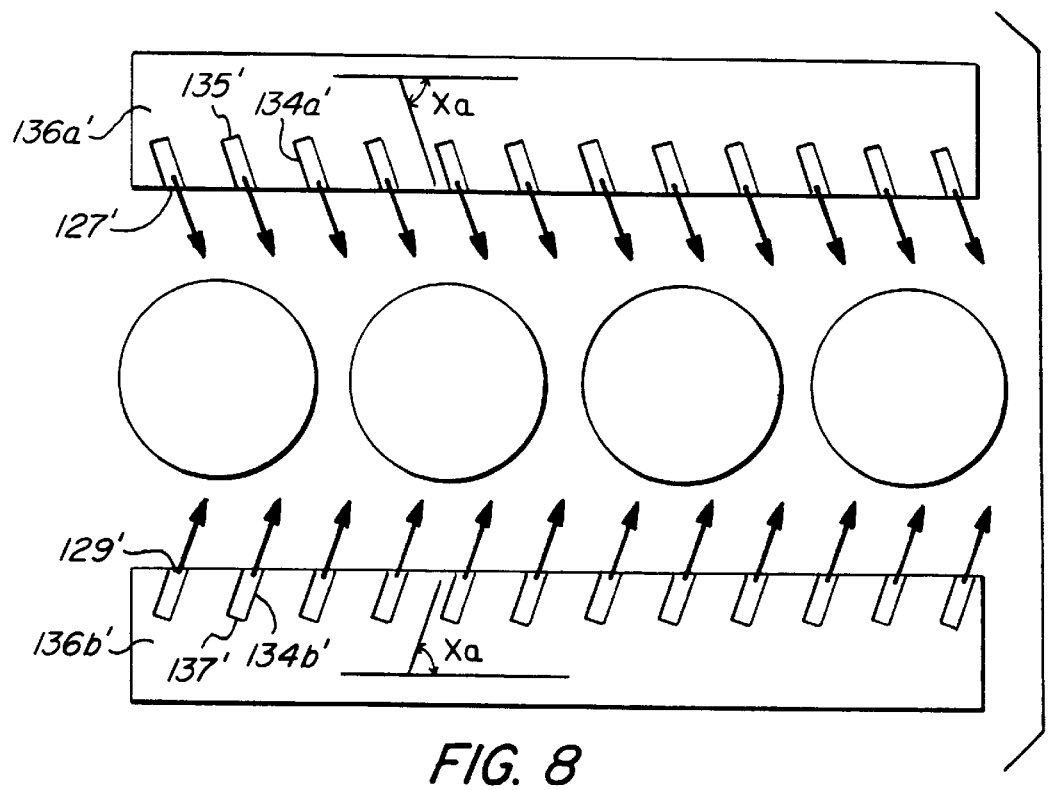
FIGS. 8 and 9 are top views of the spacer of FIG. 1 having slots forming passages wherein the slots have a larger angle and a smaller angle, respectively.
Figure 9:
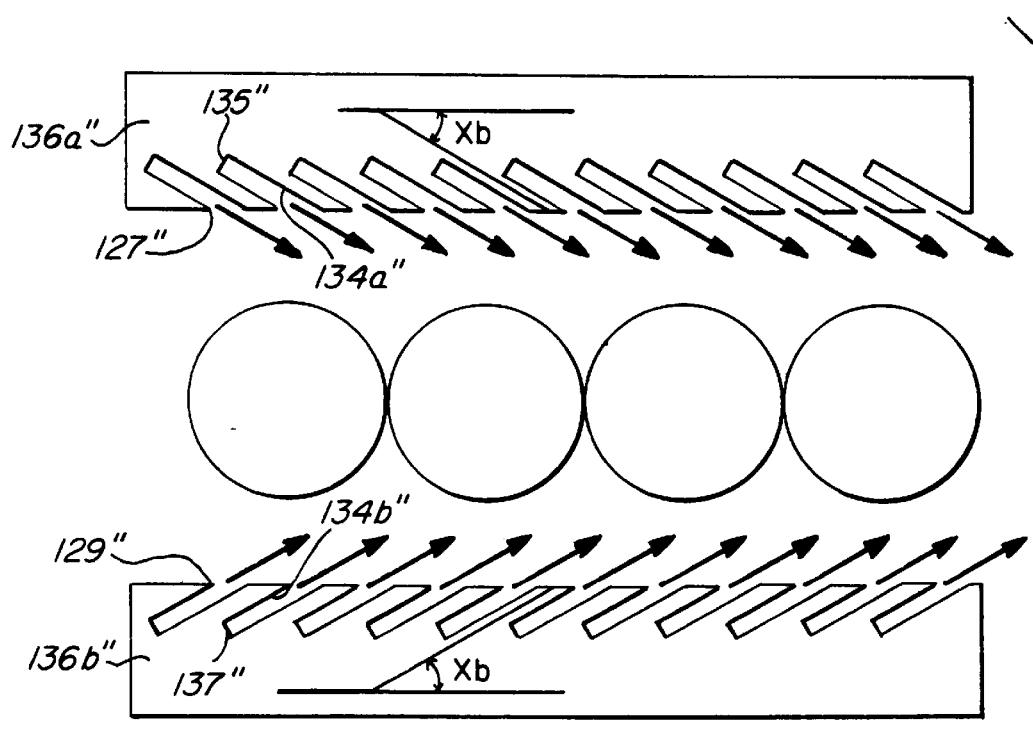

FIGS. 8 and 9 show the slot angles Xa and Xb with respect to the direction of article conveyance whereas FIGS. 1, 3, 5, 6A and 6B show the slot angle. The spacers 136a' and 136b' in FIG. 8 include slots 134a' and 134b' having open ends 127', 129' and closed ends 135', 137'. The larger slot angle Xa in FIG. 8 directs pressurized air from the slots generally creating a separation between conveyed articles at a controlled velocity. The article separation creates a cushioning effect which can minimize damage to the articles by reducing or eliminating article-to-article contact. This cushioning effect can be advantageous when conveying articles that are easily damaged during conveyance, such as aluminum cans.

The smaller slot angle Xb in FIG. 9 directs pressurized air from the slots such that it generally creates a more contiguous flow of product at a higher controlled velocity. The spacers 136a" and 136b" in FIG. 9 include slots 134a" and 134b" having open ends 127", 129" and closed ends 135", 137". A smaller slot angle Xb may be advantageous if a high article flow rate is desired and if the articles are not easily damaged from article-to-article contact. Because the spacers are easily removable, the air conveyor can be readily adaptable to have either spacers with a larger Xa or a smaller Xb slot angle.

The optimum degree of the slot angle Xa, Xb depends on several factors, such as the size, shape, and weight of the article, the contents of the article, the force of the pressurized air, the degree of incline of the conveyor, the article speed desired, and the amount of article separation desired. The optimum degree of angle for either a larger Xa or smaller Xb angle will be a function of these factors and possibly other factors.

Figure 10:
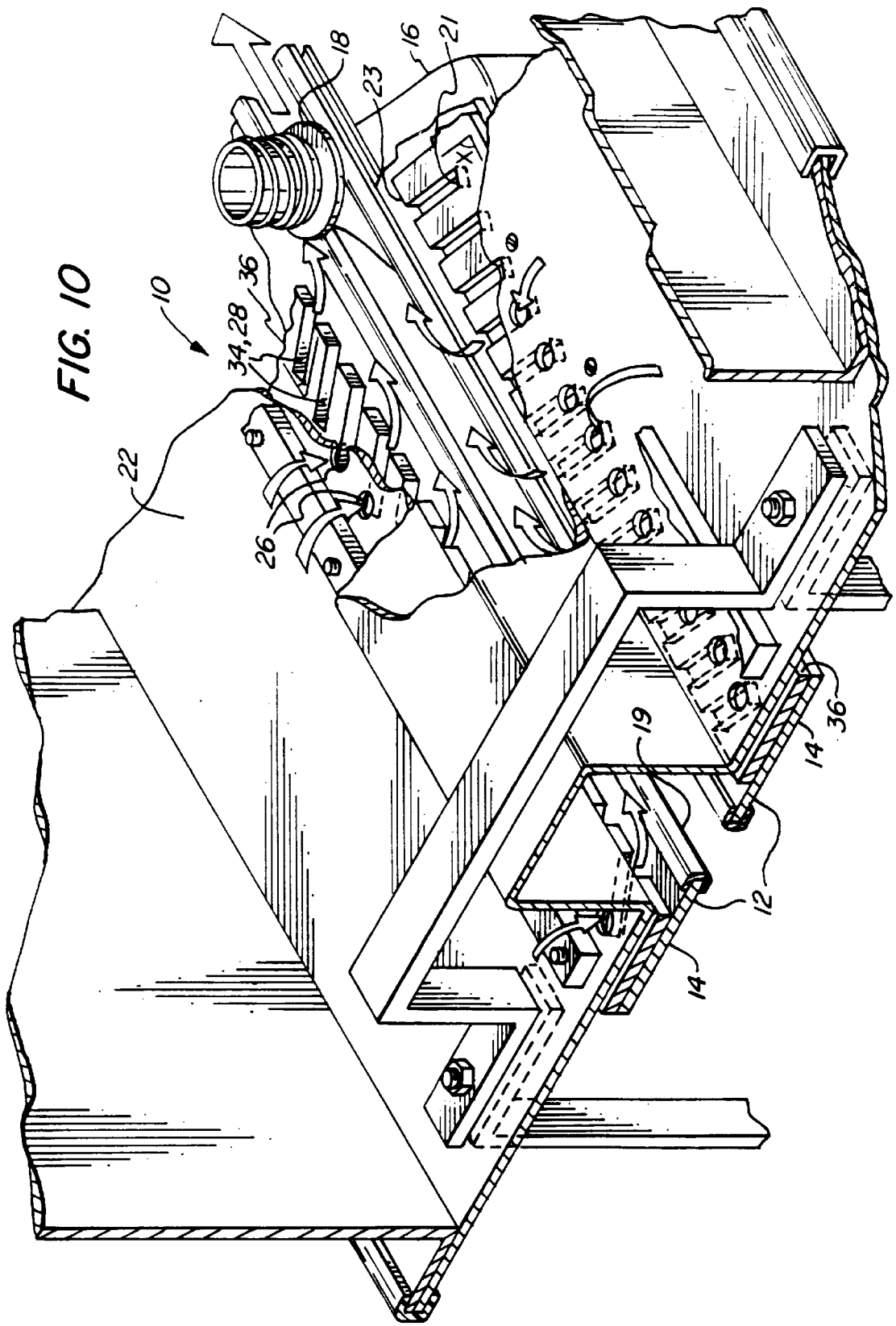
FIG. 10 is an isometric view of an air conveyor for articles with collars in accordance with the invention showing a removable spacer with slots forming passageways for directing pressurized air.

Referring to FIG. 10, an air conveyor 10 for articles 16 with collars 18 in accordance with the invention includes opposed support structures 14 with neck guides 12. As is depicted, neck guide 12 may comprise wear strips 19 attached thereto. The transported article 16 (such as the bottle depicted) includes a collar 18 around the neck area which interfaces with neck guides 12. A plenum 22 includes holes 26 which are aligned with slots 34 in a spacer 36 placed between each support structure 14 and plenum 22. Slots 34 have a closed end 21 adjacent the holes 26 and an open end 23 open toward neck guides 12. Thus, slots 34, support structure 14, and plenum 22 form passageways 28 to direct the pressurized air toward the article 16.

Figure 11:
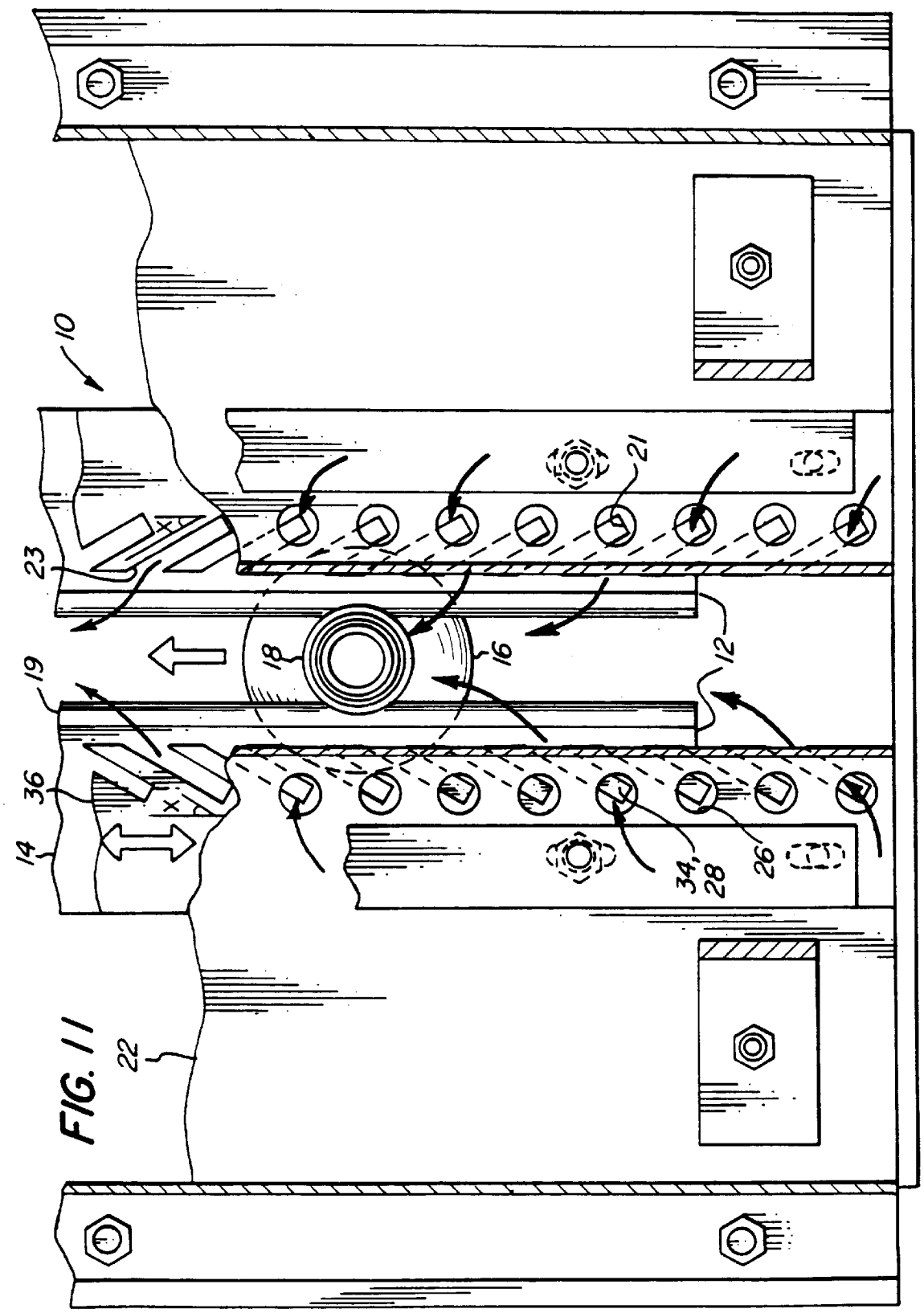
FIG. 11 is a top view of the embodiment of FIG. 10 showing the holes which communicate with the slots in the spacer and showing the downstream direction of the slots.
Figure 12:
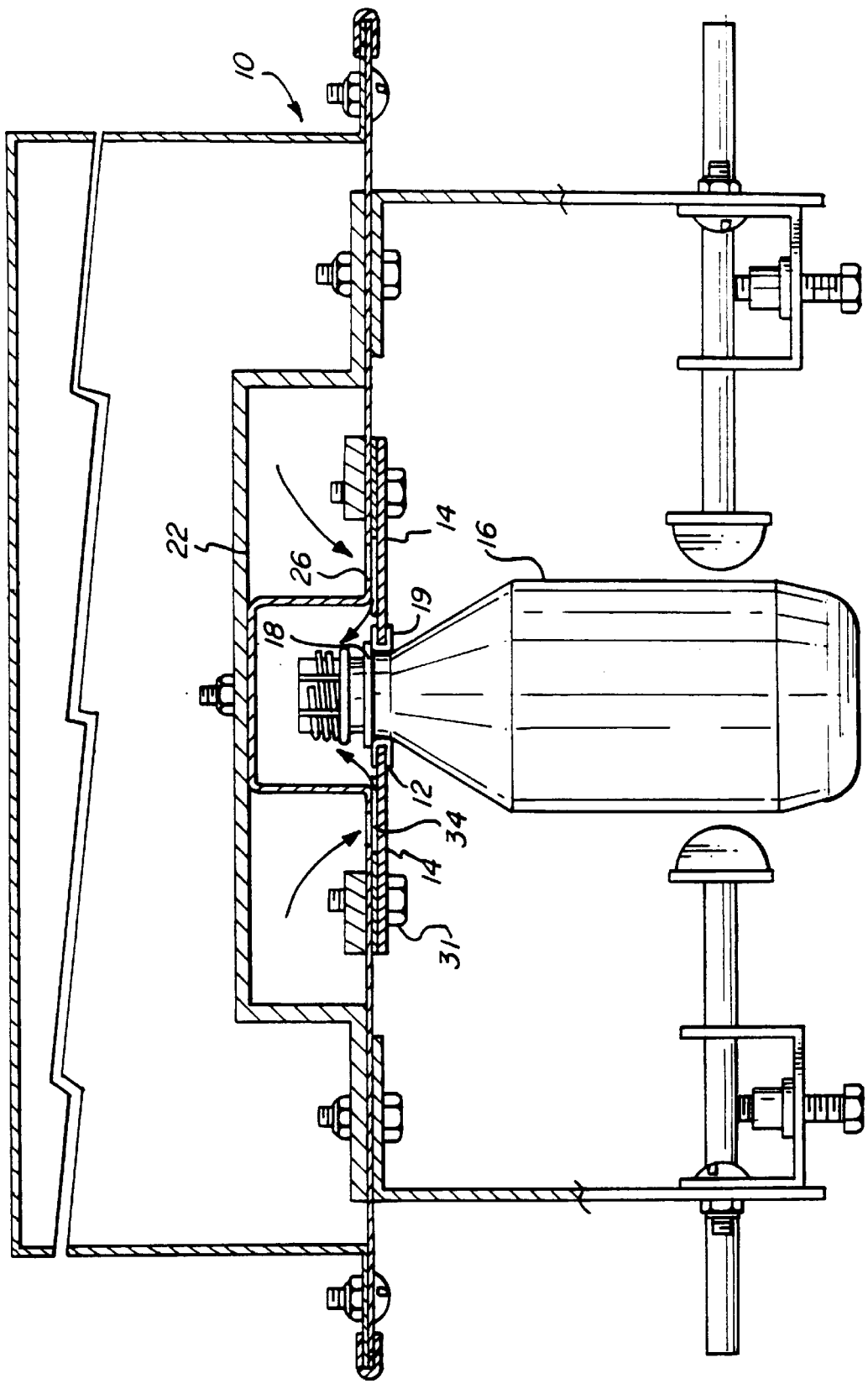
FIG. 12 is a cross-sectional end view of the embodiment of FIG. 10.

Referring to FIG. 11, holes 26 are aligned adjacent the closed end 21 of slots 34 and the slots 34 are angled downstream to propel the article 16. Referring to FIG. 12, the pressurized air flows from plenum 22, through holes 26 therein, through passageways 28, over neck guides 12, and over collar 18 of article 16. As depicted here, collar 18 of article 16 does not extend over neck guide. Also, support structure 14 for neck guides 12 may be substantially planar as shown. The air conveyor 10 is designed such that the support structure 14 and the spacer 36 are attached to the plenum 22 by bolts 31 for ease of removing therefrom and attaching thereto. This design permits the air conveyor 10 to be readily adaptable to different types and sizes of articles simply by attaching appropriately sized support structure and spacer to the plenum 22.

It should be apparent to those skilled in the art that the air conveyor 110 shown in FIGS. 1 and 2 is readily adaptable from the air conveyor design 10 shown in FIGS. 10–12.

Figure 13:
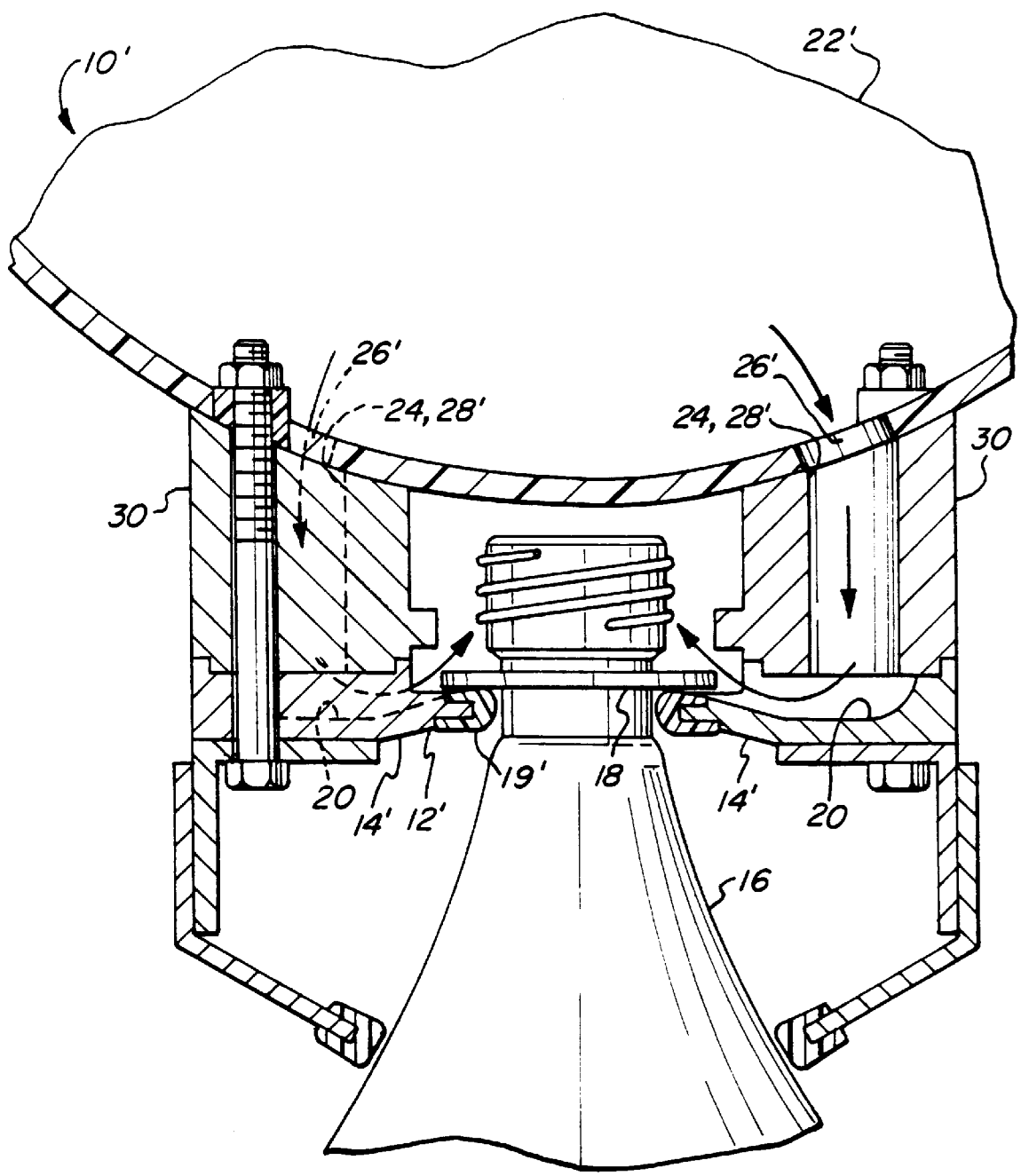
FIG. 13 is a cross-sectional end view of another embodiment of an air conveyor for articles with collars in accordance with the invention showing the flow of pressurized air from a plenum, through the air ducts and passageways, and over the collar of the article.
Figure 14:
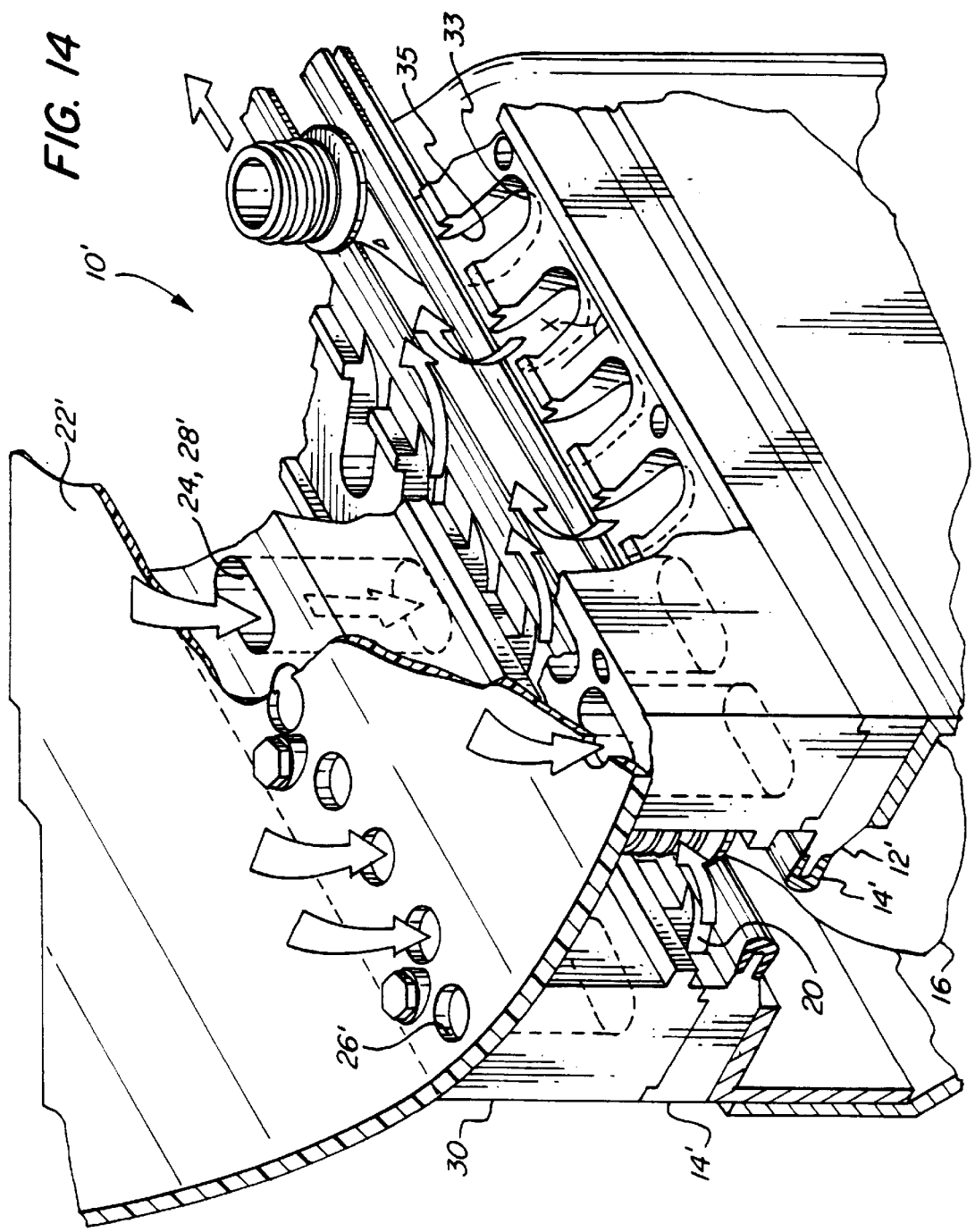
FIG. 14 is a cutaway, isometric view of the air conveyor of FIG. 13 showing the passageways formed by the plenum holes, the air ducts, and the integrally formed channels.

Referring to FIGS. 13 and 14, another embodiment of a neck guided air conveyor 10' in accordance with the invention includes opposed neck guides 12' with support structure 14'. The transported article 16 (such as the bottle depicted) includes collar 18 around the neck area which interfaces with neck guides 12'. Preferably, collar 18 extends beyond neck guides 12' and overhangs neck guides 12' such that a portion of the bottom surface of collar 18 is exposed. Neck guides 12' may include wear strips 19' or the like attached thereto.

The support structure 14' for neck guides 12' preferably includes integrally molded channels 20 having an open end 35 and a closed end 33 for directing pressurized air toward article 16. By "integrally molded" is meant that support structure 14' and channels 20 are both formed in a single piece of material. The pressurized air is directed over the collar 18 of the article 16 to provide lift at an inclined angle, thereby providing enhanced lift to article 16. Also, the channels 20 are pointed downstream to propel the articles.

Channels 20 are connected to a plenum 22' by an array of air ducts 24 via holes 26' in plenum 22'. The assembly forms passageways 28' to direct the pressurized air toward article 16. Support structure 14' forms the lower surface of passageways 28' and structure 30 for air ducts 24 forms the upper surface for passageways 28'.

The pressurized air flows from plenum 22' (such as the PVC pipe depicted), through air ducts 24, through the passageways 28', and over the collar 18 of article 16. Portions of passageways 28' are below collar 18 of the article; thus, the air streams emerging therefrom have an upward component to enhance lift.

It should be appreciated that neck guide air conveyor 10' may be readily adapted to different articles by changing neck guides 12' along with the support structure 14' therewith and/or air ducts 24. "The support structures can be removable to allow the conveyor to be adapted to different sized and shaped articles."

Figure 15:
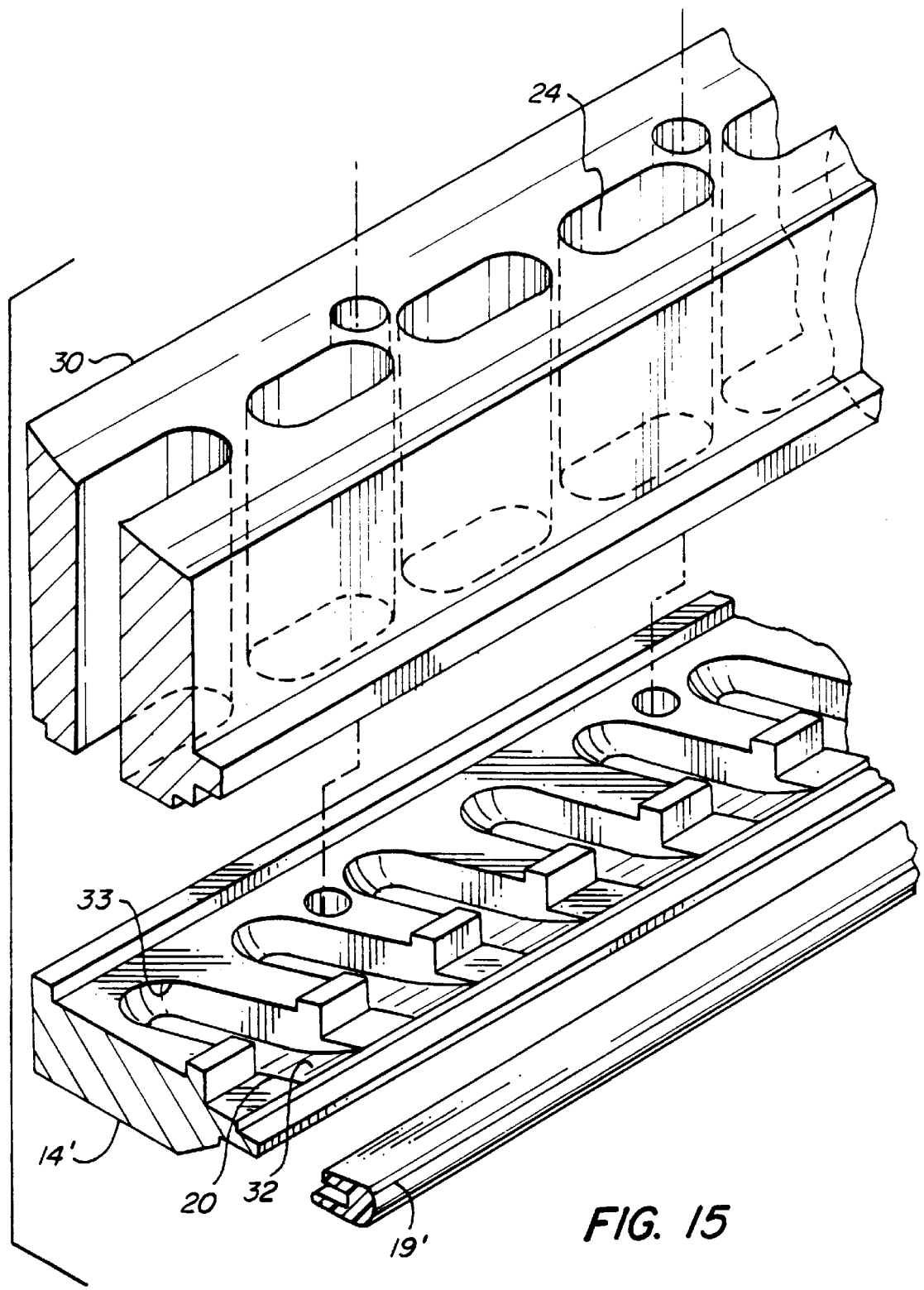
FIG. 15 is an exploded view of the air duct and neck guide support structure of FIG. 13 showing the channels integrally formed in the support structure for the neck guides.

Referring to FIG. 15, channels 20 formed in the support structure 14' for neck guides 12' include a lip 32 to direct the pressurized air over collar 18 of the article. As mentioned above, structure 30 for air ducts 24 form a portion of passageway 28' for the pressurized air when air ducts 24 and support structure 14' for neck guides 12' are assembled. Also, channels 20 are angled downstream with respect to the conveying line to propel articles 16.

Although the invention has been described with reference to particular arrangements of parts, features, and the like, these are not intended to exhaust all possible parts, arrangements or features, and indeed, other modifications and variations will be ascertainable to those of skill in the art.

What is claimed is:

1. An air conveyor for articles, said air conveyor comprising:
    guides for stabilizing the articles during conveyance;
    a first plenum having apertures, said first plenum providing pressurized air; and
    a first set of opposed spacers defining passages having a closed end and an open end, said passages being in fluid communication with said apertures of said first plenum for directing streams of the pressurized air via said open ends at the articles in a downstream direction to propel the articles, said passages having an angle with a direction of article conveyance selected for directing the streams of the pressurized air to create separation between the articles during conveyance.

2. The air conveyor of claim 1, further comprising:
    a second plenum having apertures, said second plenum providing pressurized air thereof; and
    a second set of opposed spacers defining secondary passages having a closed end and an open end, said secondary passages being in fluid communication with said apertures of said second plenum for directing streams of the pressurized air thereof via said open ends thereof at the articles in the downstream direction to propel the articles, said secondary passages having an angle with the direction of article conveyance selected for directing the streams of the pressurized air thereof to create separation between the articles during conveyance.

3. The air conveyor of claim 2, wherein said first and second plenums have thrust holes for providing the pressurized air to the articles such that there is reduced friction as the articles are directed downstream.

4. The air conveyor of claim 1, wherein said first plenum has thrust holes for providing the pressurized air to the articles such that there is reduced friction as the articles are directed downstream.

5. The air conveyor of claim 1, wherein said guides are removable to allow the conveyor to be adapted to different sized and shaped articles.

6. An air conveyor for articles, said air conveyor comprising:
    a plenum having apertures, said plenum providing pressurized air;
    opposed support structures with guides for stabilizing the articles during conveyance;
    said support structures defining channels having a closed end and an open end, said channels being in fluid communication with said apertures of said plenum to direct streams of the pressurized air via said open ends at the articles in a downstream direction to propel the articles; and
    a portion of said channels defined by said support structures being below a top of the articles and being inclined in a direction of said open ends so that the streams of the pressurized air rise over the top of the articles, said channels having an angle with a direction of article conveyance selected for directing the streams of the pressurized air to create separation between the articles during conveyance.

7. The air conveyor of claim 6, wherein said support structures are removable to allow the conveyor to be adapted to different sized and shaped articles.

8. The air conveyor of claim 6, further comprising a block having air ducts providing fluid communication between said plenum and said channels of said support structures.

9. An air conveyor for articles, said air conveyor comprising:

guides for stabilizing the articles during conveyance;

a first plenum having apertures, said first plenum providing pressurized air; and a first set of opposed spacers positioned adjacent said guides and said first plenum, each said spacer defining passages having a closed end and an open end;

said closed ends of said passages being adjacent and in fluid communication with said apertures of said first plenum for directing streams of the pressurized air via said open ends of the articles in a downstream direction to propel the articles, said passages having an angle with a direction of article conveyance for directing the streams of the pressurized air to create separation between the articles during conveyance.

10. The air conveyor of claim 9, further comprising:

a second plenum having apertures, said second plenum providing pressurized air; and a second set of opposed spacers defining secondary passages having a closed end and an open end, said secondary passages being in fluid communication with said apertures of said second plenum for directing streams of the pressurized air thereof via said open ends thereof at the articles in the downstream direction to propel the articles, said secondary passages having an angle with the direction of article conveyance selected for directing the streams of the pressurized air thereof to create separation between the articles during conveyance.

11. The air conveyor of claim 10, wherein said first plenum has thrust holes for providing the pressurized air to the articles such that there is reduced friction as the articles are directed downstream.

12. The air conveyor of claim 9, wherein said plenum has thrust holes for providing the pressurized air to the articles such that there is reduced friction as the articles are directed downstream.

13. The air conveyor of claim 9, wherein said guides are removable to allow the conveyor to be adapted to different sized and shaped articles.

14. An air conveyor for articles, said air conveyor comprising:

guides for stabilizing the articles during conveyance;

a first plenum having apertures, said first plenum providing pressurized air; and a first set of opposed spacers defining passages having a closed end and an open end, said passages being in fluid communication with said apertures of said first plenum for directing streams of the pressurized air via said open ends at the articles in a downstream direction to propel the articles, said passages having an angle with a direction of article conveyance selected for directing the streams of the pressurized air to create a contiguous flow of the articles during conveyance.

15. The air conveyor of claim 14, further comprising:

a second plenum having apertures, said second plenum providing pressurized air; and a second set of opposed spacers defining secondary passages having a closed end and an open end, said secondary passages being in fluid communication with said apertures of said second plenum for directing streams of the pressurized air thereof via said open ends thereof at the articles in the downstream direction to propel the articles, said secondary passages having an angle with the direction of article conveyance selected for directing the streams of the pressurized air thereof to create a contiguous flow of the articles during conveyance.

16. The air conveyor of claim 15, wherein said first and said second plenums have thrust holes for providing the pressurized air to the articles such that there is reduced friction as the articles are directed downstream.

* * * * *